United States Patent
Tate et al.

(10) Patent No.: US 8,470,217 B2
(45) Date of Patent: Jun. 25, 2013

(54) FOAMED MOLDING AND ITS MANUFACTURING METHOD

(75) Inventors: Yasutaka Tate, Nakatsugawa (JP); Akimasa Shimazaki, Nakatsugawa (JP); Shigeki Yoshimura, Nakatsugawa (JP); Iwao Nohara, Nakatsugawa (JP)

(73) Assignee: Daisen Industry Co., Ltd., Ageo-Shi (JP)

( * ) Notice: Subject to any disclaimer, the term of this patent is extended or adjusted under 35 U.S.C. 154(b) by 772 days.

(21) Appl. No.: 12/161,834

(22) PCT Filed: Mar. 13, 2006

(86) PCT No.: PCT/JP2006/304860
§ 371 (c)(1),
(2), (4) Date: Jul. 23, 2008

(87) PCT Pub. No.: WO2007/105285
PCT Pub. Date: Sep. 20, 2007

(65) Prior Publication Data
US 2010/0189972 A1    Jul. 29, 2010

(51) Int. Cl.
*B32B 5/18* (2006.01)

(52) U.S. Cl.
USPC .......................................... 264/45.4; 264/41

(58) Field of Classification Search
USPC .................................. 264/45.4, 41
See application file for complete search history.

(56) References Cited

U.S. PATENT DOCUMENTS

| | | | |
|---|---|---|---|
| 4,800,050 A * | 1/1989 | Hahn et al. ................. | 264/40.6 |
| 5,100,597 A | 3/1992 | Erlenbach | |
| 6,033,770 A | 3/2000 | Matsuki et al. | |
| 6,145,617 A | 11/2000 | Alts | |
| 6,613,172 B1 | 9/2003 | Tsujimoto et al. | |
| 2002/0047225 A1* | 4/2002 | Bruning et al. .............. | 264/46.4 |
| 2002/0182399 A1 | 12/2002 | Tokoro et al. | |

FOREIGN PATENT DOCUMENTS

| | | |
|---|---|---|
| DE | 24 37 224 A1 | 2/1976 |
| EP | 0 379 857 A1 | 8/1990 |
| JP | 57-026511 U | 2/1982 |
| JP | 61-064435 A1 | 4/1986 |
| JP | 07-080873 A1 | 3/1995 |
| JP | 07-308930 A1 | 11/1995 |
| JP | 10-329220 A1 | 12/1998 |
| JP | 11-333938 A1 | 12/1999 |
| JP | 2000-280270 A1 | 10/2000 |
| JP | 2000-334763 A1 | 12/2000 |
| JP | 2002-137245 A1 | 5/2002 |
| JP | 2006-110982 A1 | 4/2006 |

* cited by examiner

*Primary Examiner* — Galen Hauth
(74) *Attorney, Agent, or Firm* — Burr & Brown

(57) ABSTRACT

After heating the expandable resin beads to sealing temperature of expandable resin beads in the presence of heated steam, foam cells are sealed and cooled while controlling the foaming amount. The foaming amount is controlled by pressure control on the expandable resin beads in the mold. Mutually adjacent foam cells are softened, fused, and bonded on contact faces, and thereby a foamed molding is manufactured. This foamed molding is characterized by three-dimensional permeable pores of volume porosity of 10 to 40% among foam cells, having bending limit strength of at least 10N. Without using adhesive resin, a foamed molding having enough strength and desired porous structure is obtained.

5 Claims, 7 Drawing Sheets

FOAMED MOLDING AND ITS MANUFACTURING METHOD

FIELD OF THE INVENTION

The present invention relates to a foamed molding obtained by heating expandable resin beads filled in a mold, and a method of manufacturing the same.

BACKGROUND OF THE INVENTION

A foamed molding obtained by heating and foaming expandable resin beads such as expandable polystyrene beads or expandable polyolefin beads filled in a mold has been traditionally used widely for containers of fresh foods, such as, fish cases, transport boxes and buffer material. Considering the applications, heat insulation and resistance to impact properties are important, and most materials are substantially non-permeable, a porous structure suited to sound absorbing material is hardly known.

It has been studied to develop a sound absorbing material by forming a proper porous structure in a foamed resin molding, but to realize a preferred porosity for sound absorbing material, the heating temperature must be lowered, but the bond strength of foamed cells lowers, and practical structural strength as a molding is not obtained, and practical material has not been developed. By solving the problems, a sound absorbing material achieving both porous structure desired and the structural strength suitable for sound absorbing material is disclosed in patent document 1.

The sound absorbing material in patent document 1 is made of expandable resin beads, and is manufactured by adhering a heat-sealable resin sealable at lower temperature than the softening and foaming temperature of the particles to the surface, adjusting they foaming amount when molding so as to leave a porous structure, and adhering and bonding the foamed cells each other by this adhesive resin.

However, since the adhesive resin is used, this sound absorbing material had the following practical problems.

1. The material cost and processing cost are increased because of the additional adhesive resin.
2. The fluidity of expandable resin beads is lowered by the adhesive resin, and the filling device may be clogged, the filling degree in the mold is not uniform, and the operability is inferior.
3. The heat resistance and long-term durability of the sound absorbing material are substantially lowered due to low temperature softening characteristic of the adhesive resin.

Patent document 1: Japanese Patent Publication No. 3268094

SUMMARY OF THE INVENTION

Problems to be Solved by the Invention

It is an object of the invention to solve, the problems of the prior art, and present a foamed molding, not using adhesive resin, and having a preferable porous structure for sound absorbing material, having enough structural strength applicable also in heat insulator and buffer material for package, and capable of preventing cost increase due to the adhesive resin, and decline in operation, heat resistance or long-term durability, and a method of manufacturing the same.

Means for Solving the Problems

The invention is based on the finding that expandable resin beads are mutually softened and sealed strongly while forming gaps among particles, by controlling the expansion amount of expandable resin beads under the sealing temperature condition in the foaming and molding process by using expandable resin beads.

The foamed molding of the invention developed for solving the problems of the prior art is a foamed molding composed of innumerable foam cells obtained by heating expandable resin beads filled in a mold, and is characterized by three-dimensional permeable pores of volume porosity of 10 to 40% among non-contact faces of foam cells sealed on contact faces by heating of mutually adjacent foam cells at the time of heating and foaming, and the bending limit strength of at least 10N.

The invention is realized in a form of adding a surface layer of smaller volume porosity in part or whole of the outer surface of the foamed molding, in which the surface layer is preferably formed integrally at the time of foaming and molding. The invention is realized in a form reinforced by adding reinforcing foam of higher strength in part of the foamed molding. In this case, the reinforcing foam is preferred to be formed integrally at the time of foaming and molding of the foamed molding.

The invention has the foregoing configuration, and is also desired to have a thickness of surface layer of 10 to 45% of the overall thickness of the foamed molding. By adding the surface layer having such thickness, the foamed molding to be used in automobile interior materials is realized, and in particular the surface layer is used on the car body floor at the compartment side, and the undulations of the car body floor of an automobile are flattened, and a foamed molding usable as vehicle floor flat material that reduces vibration noise is achieved. The invention is also realized as foamed molding to be used in sound absorbing material for building, noise suppressing material for road and railway, sound absorbing material for housing, and sound absorbing material for industrial machinery. In this case, the thickness of the surface layer is preferred to be 5 to 40 mm.

The manufacturing method of foamed molding of the invention is a manufacturing method of foamed molding composed of a foamed molding obtained by heating and foaming of expandable resin beads filled in a mold, and is characterized by forming three-dimensional permeable pores of volume porosity of 10 to 40% among foam cells by softening and fusing of mutually adjacent foam cells, on contact faces, by heating the expandable resin beads at sealing temperature of the expandable resin beads in the presence of heating steam, and sealing and cooling the foam cells while controlling the foaming amount, and obtaining a foamed molding having a bending limit strength of at least 10N.

The foaming amount can be controlled by controlling the pressure applied to the expandable resin beads. Pressure control is preferred to be conducted up to the sealing end temperature of expandable resin beads. After heating up to the sealing temperature, when cooling while controlling the temperature, the heated steam in the mold is preliminarily displaced with air, or operation is done while displacing the heated steam in the mold with air. In the presence of heated steam, the expandable resin beads are heated to sealing temperature of, the expandable resin beads, and control air of higher pressure than the internal pressure of the mold is applied into the mold, and the pressure is controlled by setting higher pressure in the mold, or to set the pressure in the mold higher, it is preferred to apply control air of about more than 1.5 times of the internal pressure of the mold into the mold, and the temperature of the control air to be applied to the mold is preferred to be internal temperature in the time at the time of application to ordinary temperature. When manufacturing a foamed molding reinforced by adding reinforcing foam, the mold may be provided with individual passages communicating with the external piping. The core vent in the die may control the effect of control air.

Effects of the Invention

The foamed molding of the invention is formed of mutually adjacent foam cells bonded together on the contact faces by own fusion at the time of heating and foaming, and without using adhesive resin, a porous structure of volume porosity of 10% to 40% and a practicable structural strength capable of withstanding handling and transportation can be both realized. It is hence not only preferable as sound absorbing material, but also applicable as heat insulating material or buffer material for package, and the increase of cost due to adhesive resin is suppressed. The natural characteristics of the expandable resin beads can be fully utilized, and the heat resistance and long-term durability are excellent.

In addition, a surface layer of smaller volume porosity may be added to the outer surface of the foamed molding, and this surface layer functions as protective layer, and functions as sound insulation layer or reflecting layer as the sound absorbing material, so that the sound absorbing effect may be enhanced. In part of the foamed molding, reinforcing foam of additional higher structural strength is not limited to the role of sound absorbing material; it can be used in an application as structural member supporting the strength.

According to the manufacturing method of foamed molding of the invention, by carrying out a new operation in the foaming and sealing process of expandable resin beads, the foamed molding can be manufactured without using adhesive resin. When controlling the foaming amount by the pressure on the expandable resin beads, while balancing the internal pressure and external pressure at the time of foaming of expandable resin beads, the foaming amount can be adjusted, and a desired volume porosity is realized, and therefore the conventional raw materials for expandable resin beads can be directly used, and when cooling while controlling the decompression speed, the heated steam in the mold can be displaced with air, and variation factors of temperature conditions due to latent heat of heated steam can be eliminated, and the foaming and sealing process conditions can be stabilized.

Thus, the foamed molding, of the invention and its manufacturing method have solve the conventional problems, and are capable of obtaining preferable porous structure and structural strength for sound absorbing material without using adhesive resin. Besides, the cost increase due to adhesive resin can be suppressed, the operability is good when molding, and decline of heat resistance and long-term durability can be prevented.

BRIEF DESCRIPTION OF THE DRAWINGS

FIG. 4 (A), (B), (C) are explanatory diagrams of bonded state of foam cells.

DESCRIPTION OF REFERENCE NUMERALS

1 Foamed molding
11 Foam cell
11a Contact face
12 Space

DETAILED DESCRIPTION OF THE INVENTION

Figure 7:
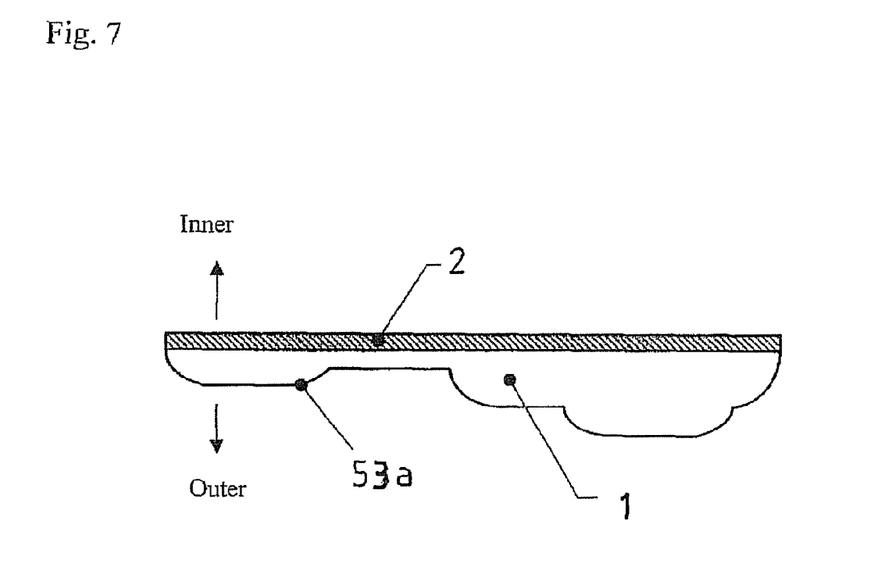
FIG. 7 is a perspective view of an internal structure of an automobile.

Preferred embodiments of the invention are explained below. The embodiments relate to interior materials of an automobile as shown in FIG. 7, featuring the foamed molding, excellent in heat resistance, impact resistance, and sound absorbing property.

(Foamed Molding)

Figures 1, 2:
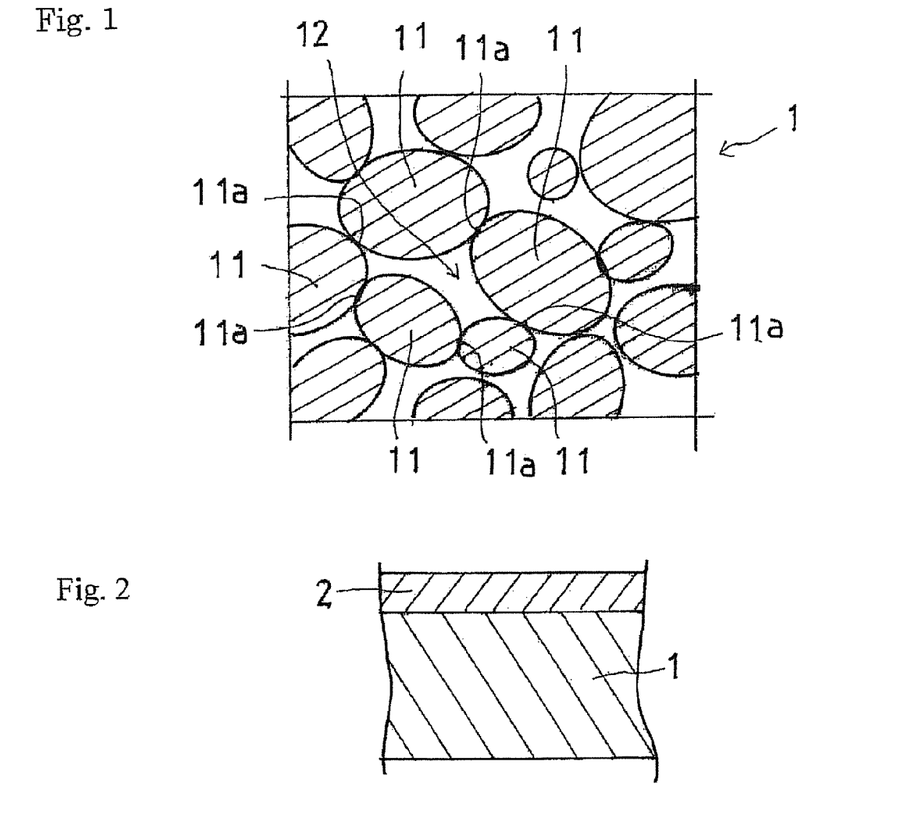
FIG. 1 is a schematic sectional view of a foamed molding of the invention.
FIG. 2 is a schematic sectional view showing other mode of foamed molding of the invention.
Figure 4:
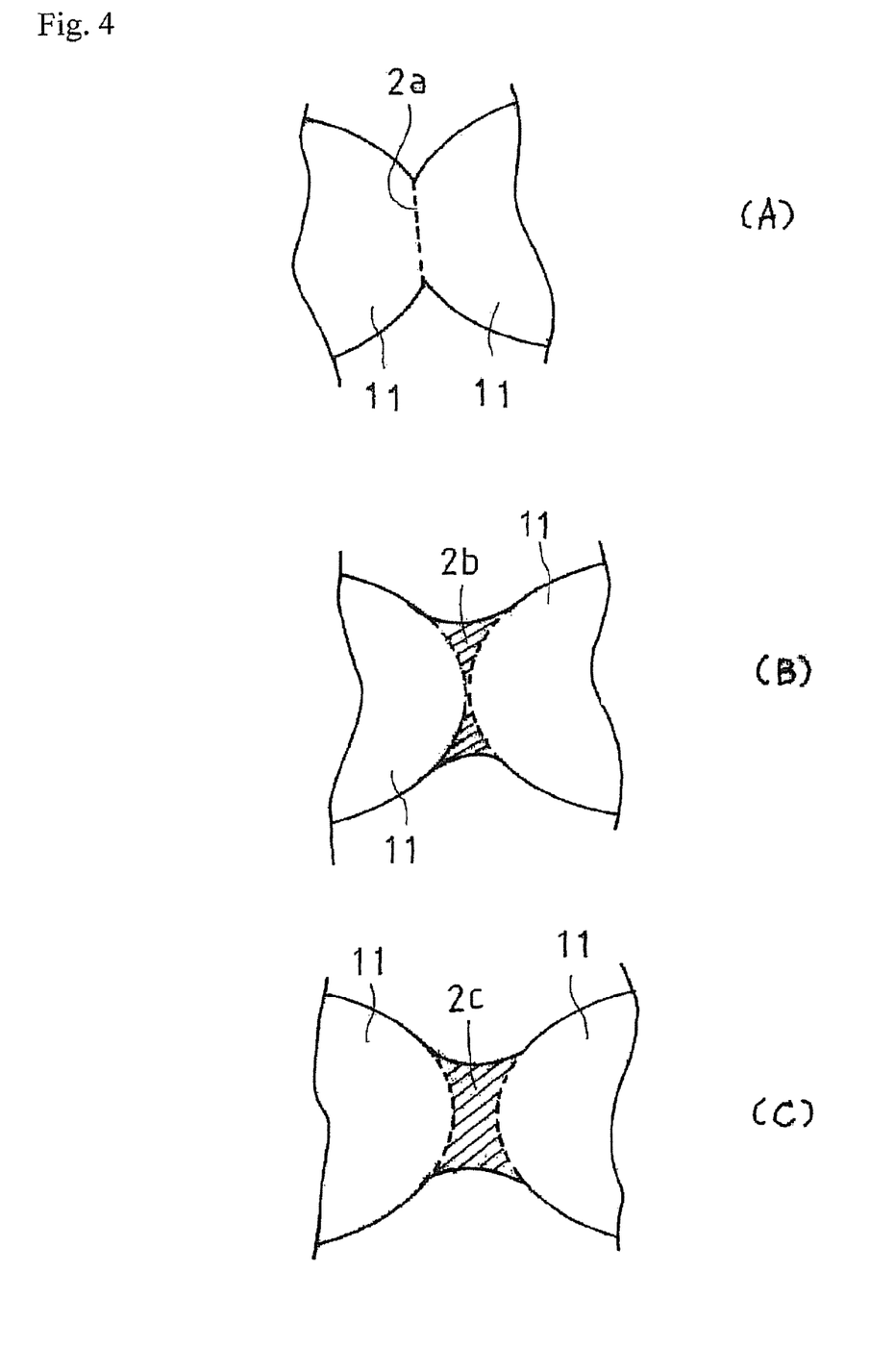

The foamed molding, of the invention is composed of innumerable foam cells obtained by heating and foaming of expandable resin beads such as polystyrene or polyolefin, filled in a mold. As shown in FIG. 1, the foamed, molding of the invention is composed of innumerable foam cells 11 obtained by heating and foaming of expandable resin beads in a mold, and, the adjacent foam cells 11, 11 are mutually softened, fused and bonded on contact faces 11a, 11a as shown in FIG. 4. That is, the sealed bonded portions are formed of fused foaming resin materials, and the properties are exactly same as in the foaming resin materials.

The foamed molding 1 has a three-dimensional porous structure formed of opening pores in a space 12 surrounded by at least three foam cells 11 (in FIG. 1, a space 12 surrounded by five foam cells 11 is shown), and has at least the following properties.

That is, the three-dimensional pores are characterized by volume porosity, or ratio of pore volume to whole volume, of 10 to 40%, and bending limit strength of at least 10N. The three-dimensional pores are branched in multiple channels, bending zigzag, and the inside diameter expands and contracts irregularly and repeatedly to form complicated space routes, and the incoming sound waves are damped by reflecting, interfering and resonating, so that a sound absorbing function is realized.

If the volume porosity is less than 10%, the strength is increased, but the sound absorbing effect is inferior, and it is not preferred for sound absorbing material. If the volume porosity is more than 40%, the sound absorbing effect tends to decline, and sufficient mechanical strength is not obtained, and it is desired from the structural reason. As the strength of sound absorbing material of the invention, at least, the shape retaining strength withstanding handling should be required. In this respect, the bending limit strength of at least 10N is needed. The bending limit strength is specified in JIS K 7221, in which a bar-shaped sample of 25 mm in width, 20 mm in height, and 120 mm in length is supported on a supporting point of 100 mm in span, and a concentrated load is applied to the center in bending test, and the limit load is measured. The bending limit strength of 10N corresponds to a bending stress of 0.15 MPa by calculation.

The foamed molding of the invention is also characterized by the shape of foam cells as explained below. The cut section of the foam cell is a particle of circular section or elliptical section, and its size is preferably 1.5 to 5.5 mm on the basis of the major diameter, and if out of this range, desired pore volume for sound absorbing material is not obtained, and it is not suited to sound absorbing application. The individual foam cells are preferred to be particles of elliptical section in a range of major diameter/minor diameter of 3.0, so that desired pore volume for sound absorbing effect may be easily obtained.

Further, as shown in FIG. 2, preferably, one side of the foamed molding 1 is provided integrally with a surface layer of smaller volume porosity than the main body portion of the foamed molding 1. This surface layer 2 functions as protective layer of the foamed molding 1, and also functions as sound insulation layer or reflecting layer as the sound absorbing material, so that the sound absorbing effect may be enhanced, and therefore its volume porosity is required to be smaller than that of the foamed molding 1, or a non-permeable rigid resin layer may be used depending on the purpose.

The surface layer 2 may be disposed freely as desired, as shown in FIG. 2, for example, on the whole surface of one side of the foamed molding 1, part of one side, or part or whole of both sides, depending on the purpose. The surface layer 2 may be separately adhered to the foamed molding 1, but it, is desired to form integrally at the time of foaming and molding the foamed molding 1 from the viewpoint of the manufacturing cost. The foamed molding having such structure can be manufactured by adjusting the heating condition of the position corresponding to the surface layer 2.

Figure 3:
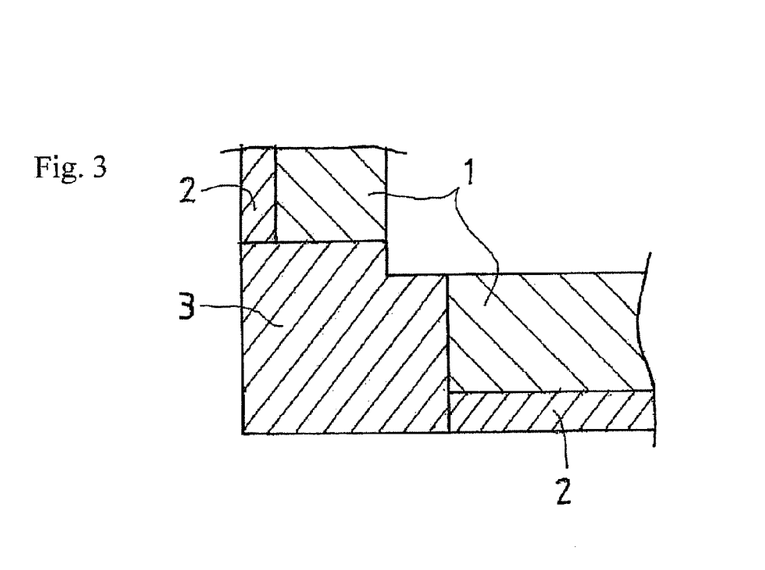
FIG. 3 is a schematic sectional view showing another mode of foamed molding of the invention.

Further, as shown in FIG. 3, preferably, a part of the foamed molding 1 is provided with a reinforcing foam 3 of greater tear strength, and not limited to sound absorbing material, the scope of applications is extended to a structural member for supporting the strength. In FIG. 3, the reinforcing foam 3 is disposed at a corner of the foamed molding 1 having a flexural angle, and the surface layer 2 is formed together, but the reinforcing foam 3 may be increased in strength by setting the volume porosity lower same as in the surface layer 2. In this case, too, it is desired to form the reinforcing foam 3 integrally by adjusting the heating condition at the time of foaming and molding the foamed molding 1 from the viewpoint of the manufacturing cost. Meanwhile, in order to form the reinforcing foam 3 greater in tear strength in part of the foamed molding 1, the mold may be provided with individual passages communicating with external piping for supply of steam.

Figure 8:
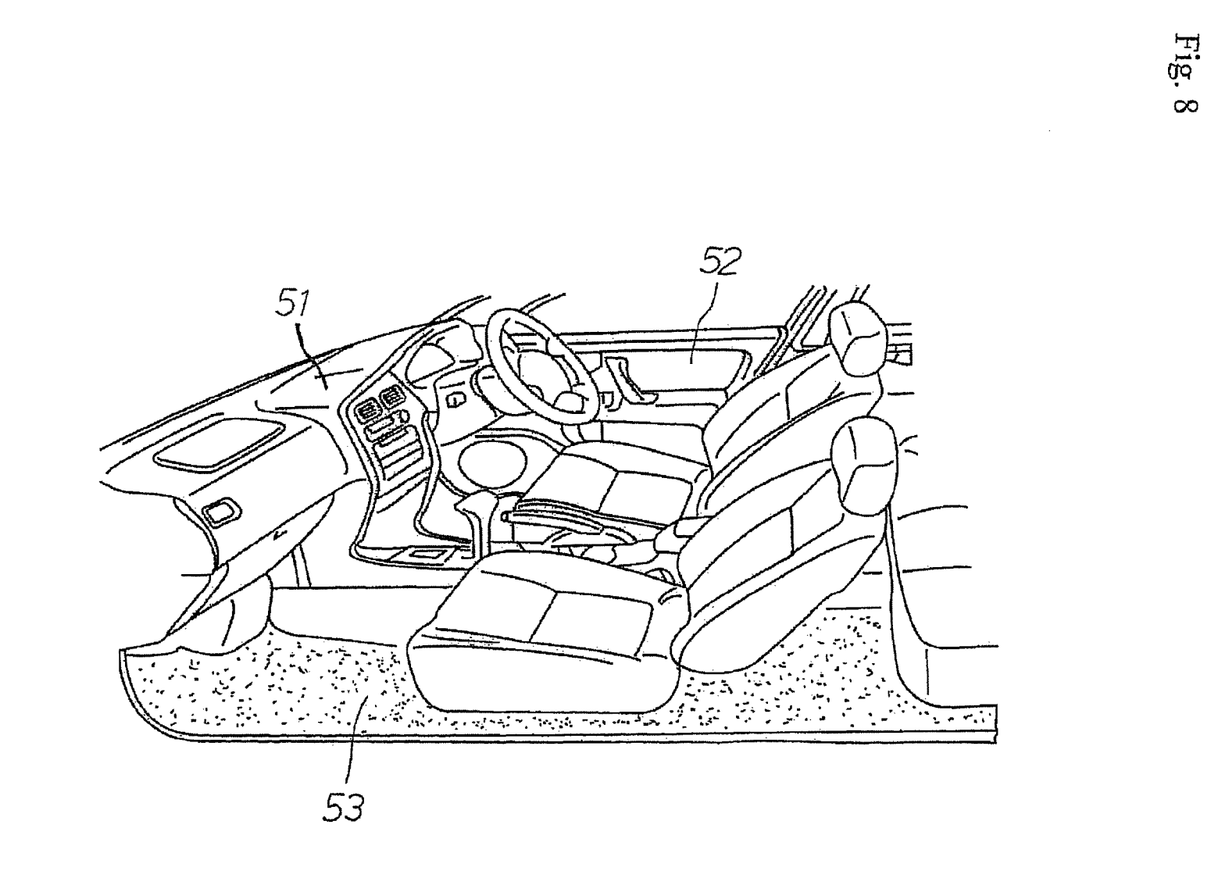
FIG. 8 is a schematic sectional view of interior members of an automobile.

The foamed molding of the invention is used not only as sound absorbing material, but also as structural member for supporting the strength, and hence it is suitable as interior member of an automobile demanding both sound absorbing effect and strength. As shown in FIG. 7, it may be used in dashboard 51, compartment inner wall 52, or floor 53. In this case, the thickness of the surface layer 2 is preferred to be 10 to 45% of the overall thickness of the foamed molding, and the thickness of the foamed molding 1 is the remaining thickness (90 to 55%). When used on the floor 53, in particular, as shown in FIG. 8, the surface layer 2 is disposed at the compartment side, the foamed molding 1 is interposed opposite to the car body floor, and the undulations of the surface of the car body floor 53a may be flattened by this foamed molding, so that a floor flat member for vehicle may be realized. In this case, the thickness of the surface layer is preferred to be 5 to 40 mm.

Not limited to the interior material of an automobile, the invention may be also applied as materials for sound absorbing interior member for wall and ceiling of building, noise insulating member for road and railway, sound absorbing member for housing, and sound absorbing member for industrial machinery. In this case, the surface layer 2 forms a decorative surface having a proper strength, and its thickness is desired to be 10 to 45% of the overall thickness of the foamed molding, and more specifically the thickness of the surface layer 2 desired to be 5 to 40 mm.

(Manufacturing Method of Foamed Molding)

The manufacturing method of the foamed molding of the invention is explained below while comparing with a conventional method.

Figure 5:
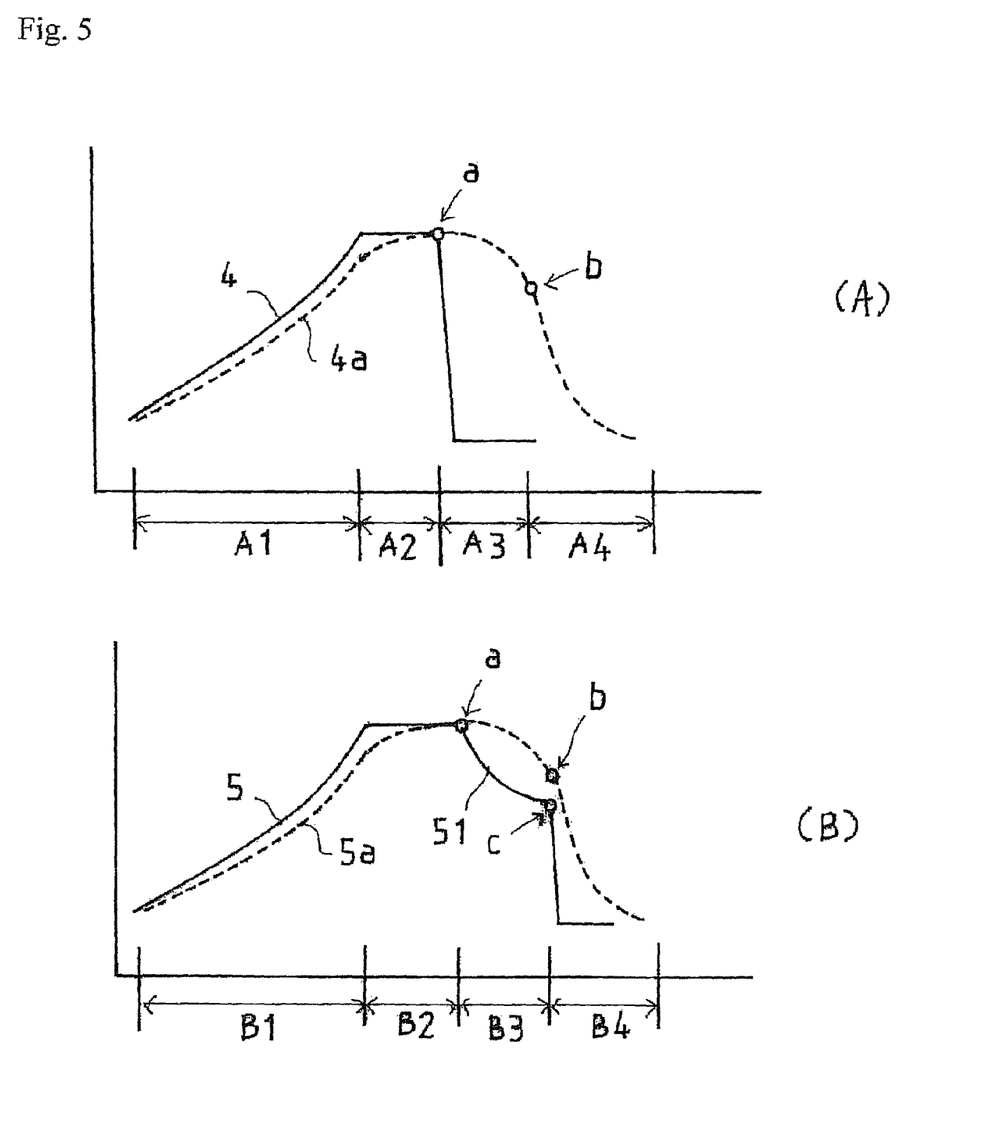
FIG. 5 is a schematic transition graph showing the relation of pressure, temperature and time in molding process, (A) referring to a prior art and (B) referring to the manufacturing method of the invention.

FIG. 5 is a graph showing the relation of pressure (pressure curves 4, 5) and temperature (temperature curves 4a, 5a), plotted on the axis of ordinates, and the lapse of time, plotted on the axis of abscissas, in the cavity containing expandable resin beads, as important operating conditions in the foaming and molding method, while slighting exaggerating the behavior schematically, and FIG. 5 (A) shows a conventional manufacturing method for obtaining non-permeable foamed molding, and FIG. 5 (B) relates to the manufacturing method of the invention.

First, the conventional manufacturing method for obtaining non-permeable foamed molding is explained in FIG. 5 (A), in which the process is roughly classified into temperature elevation step A1, heating step at sealing temperature A2, foaming and sealing step A3, and cooling and discharge step A4.

<Corresponding Conventional Method>

A1. Temperature Elevation Step

The temperature in the cavity is elevated, that is, after filling with expandable resin beads, the chamber is evacuated, and the heating steam is exhausted in one direction and exhausted in opposite direction in the cavity, and the inside is heated by steam and filled with steam. Pressure curve 4 and temperature curve 4a actually elevate in zigzag profile, but temperature curve 4a follows pressure curve 4.

A2. Heating Step at Sealing Temperature

Expandable resin beads are foamed (expanded), and sealed, and molded into a shape conforming to the cavity shape, by heating uniformly with heating steam, and heating to the sealing temperature uniformly. At this step, the expandable resin beads are pressurized and compressed to a particle shape at vapor pressure corresponding to the sealing temperature, and the particles are free to flow in the cavity.

A3. Foaming and Sealing Step

At point (a) when heated uniformly to the sealing temperature, supply of steam is stopped, and the exhaust valve is opened to release the pressure. As a result, the compressed expandable resin beads are suddenly decompressed under the melting temperature, and are suddenly foamed (expanded) by the internal pressure, and kill the mutual gaps to press against each other, so that the contact faces are sealed. Herein, the pressure drops sharply as indicated by pressure curve 4, and the expanded foamed resin particles (foam cells) are adiabatic, and the temperature in the cavity does not follow the pressure curve 4, but is delayed and lowered to sealing end temperature, point (b), as indicated by temperature curve 4a. Herein, the sealing end temperature is the temperature at which the sealing phenomenon stops its progress.

A4. Cooling and Discharge Step

The inside of the mold is cooled by water, and the molding foamed and molded in specified shape is taken out. The temperature drops suddenly.

As a result, the adjacent foam cells are sealed entirely, and a substantially non-permeable foamed molding is obtained.

<First Preferred Embodiment of the Method of the Invention>

The manufacturing method of foamed molding of the invention is explained while referring to FIG. 5 (B).

The manufacturing method of foamed molding of the invention is roughly classified into temperature elevation step B1, heating step at sealing temperature B2, foaming and sealing step B3, and cooling and discharge step B4. Herein, the temperature elevation step B1 and the heating step at sealing temperature B2 are the process of heating the expandable resin beads in the presence of heating steam, uniformly to the sealing temperature of the expandable resin beads, and are same as in the temperature elevation step A1 and the heating step at sealing temperature A2 explained above.

B3. Foaming and Sealing Step

This step is characteristic of the invention, next to the heating step at sealing temperature B2; this is a process of sealing the foam cells while controlling the foaming (expanding) amount of expandable resin beads. Specifically, instead of decompressing suddenly as in the foaming and sealing step A3, while adjusting the supply and exhaust of the steam, it is designed to decompress gradually to end while controlling the pressure along the pressure route so that pressure curve 5 may change from point (a) to point (c) shown in FIG. 5 (B).

In FIG. 5 (B), the internal pressure in the cavity is reduced while controlling until point (c) of control end pressure, from point (a) where the uniform predetermined sealing temperature is reached in the cavity, until point (b) of sealing end temperature. The purpose of this pressure control is to foam (expand) the expandable resin beads in sealing temperature region while balancing between the internal pressure of particles (particle inner pressure) and external pressure (cavity inner pressure), that is, by adjusting the foaming (expanding) amount by controlling the decompression, the expandable resin beads are mutually pressed while leaving a space mutually between expandable resin beads (volume porosity), and are sealed on contact faces. Thus, a foamed molding is obtained, that is, a substantial component material of the foamed molding of the invention, formed of foam cells sealed and bonded to specified tear strength of bending limit strength having three-dimensional pores of specified volume porosity.

Generally, when the decompression speed is higher, the expansion is promoted, and the volume porosity is lowered, or when the decompression speed is lower, the expansion is suppressed, and the volume porosity is raised, but since the foaming property of the expandable resin beads varies depending on the type of the resin or pre-foaming process, and the degree of decompression speed, the decompression curve, and the value of control end pressure (c) should be determined by preliminary tests on the basis of the expandable resin beads to be used.

This pressure control is appropriately continued until reaching point (b) of sealing end temperature of the expandable resin beads to be used. The sealing end temperature is the temperature when sealing of foamed cells stops its progress, and if the pressure is controlled beneath this temperature, the desired effect is not expected.

The expandable resin beads are not limited to polystyrene, but in the case of polyolefin, needless to say, the lower limit sealing temperature, upper limit sealing temperature, and sealing end temperature are higher than in the polystyrene resin.

The foaming and sealing step B3 is followed by the cooling and discharge step B4, and this step is same as the cooling and discharge step A4 of the prior art.

Thus, the foamed molding of the invention is obtained, that is, the foamed molding is composed of adjacent foam cells softened, fused and bonded each other, having three-dimensional pores of volume porosity of 10 to 40%, and having the bending limit strength of at least 10N.

In pressure control in the foaming and sealing step, it is preferred to displace the heating steam filling the mold preliminarily with air, or displace the heating steam with air while controlling the pressure. The reason is that the majority of steam is changed to condensed water usually in pressure control, and it is accompanied by large volume changes, or generation of sensible heat of liquefaction, and effects larger than expected may occur on the temperature or pressure in the process, and the stability of pressure control may be spoiled. When using air, as compared with steam, it may be easier to control the temperature elevation or decline.

<Second Preferred Embodiment of the Method of the Invention>

Figure 6:
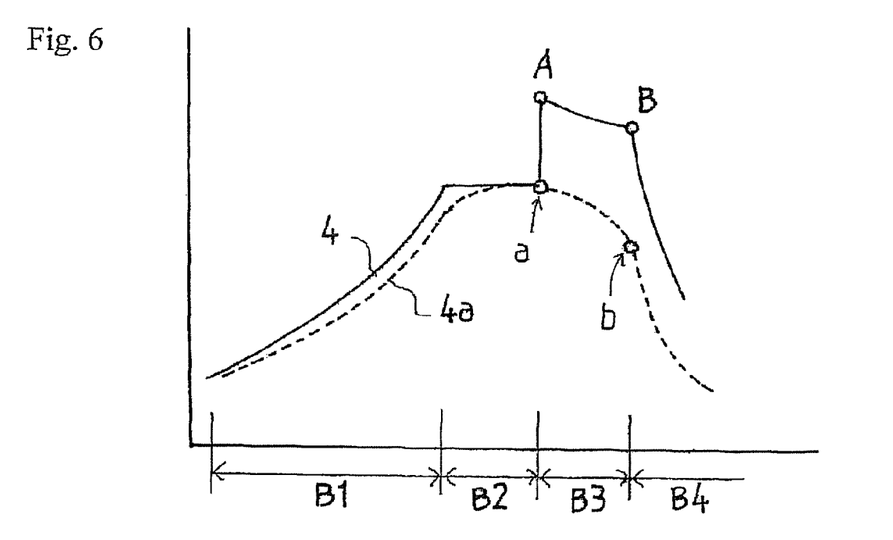
FIG. 6 is a graph similar to FIG. 5, showing a manufacturing method in a second preferred embodiment of the invention.

The second preferred embodiment is explained while referring to FIG. 6. In the second preferred embodiment, in the presence of heating steam, when the expandable resin beads are heated to sealing temperature, control air of higher pressure than internal pressure of the mold is introduced into the mold, and the mold is pressurized to a higher pressure. Steps B1, B4, B5 are same as in the first preferred embodiment.

B2) Heating Step at Sealing Temperature

In order to foam (expand) the expandable resin beads, and seal and mold into specified shape conforming to the cavity shape, the entire particles are heated by heating steam, and heated uniformly to the sealing temperature. In the latter half of this process, the foaming polystyrene resin particles are heated at a steam pressure corresponding to the sealing temperature, and are heated to the sealable temperature, and the foaming pressure of the foam components is suddenly elevated, and foaming is progressed, and multiple adjacent particles are changed to contact state from the free flowing state, and the sealing is started and promoted in the contact area.

B3) Foaming and Sealing Step

After step B2, this is the process of completing sealing of foam cells while controlling the foaming (expanding) amount of expandable resin beads and forming gaps. In the first preferred embodiment shown in FIG. 5B, while adjusting the supply and exhaust of steam, the pressure line 5 is lowered gradually from point (a) to point (c), but in FIG. 6, when the mold is heated to a uniform predetermined sealing temperature and sealing starts at point (a), the control air is introduced, and the mold pressure is raised to higher pressure of point A. After this pressurizing operation, the pressure is reduced while controlling to control end pressure of point B. This control end pressure of point B is the pressure corresponding to point B of sealing end temperature.

The purpose of application of high pressure by the control air of the invention is to prevent realization of a sealing state of filling up mutual gaps of particles by expanding momentarily due to slight decompression, due to extremely unstable foaming internal pressure of polystyrene expandable resin beads reaching the sealing temperature, that is, induction of so-called explosive sealing phenomenon. By controlling the pressure later, while balancing the internal pressure of particles (particle internal pressure) and the external pressure (cavity internal pressure) sealed portions can be formed on the contact faces while leaving gaps (volume porosity) between mutual expandable resin beads.

For such purpose, air must be used instead of steam. As compared with steam, air hardly invades into the foaming particles, and it is easier to control external pressure on particles. As the control air for this purpose, it is important to set the temperature and pressure appropriately. In the invention, the control air to be introduced is most preferably a pressuring air having a pressure capable of pressuring up to 1.5 times or more, more preferably 2 times or more of the mold internal pressure when the mold is heated to the sealing temperature. The temperature of the control air is preferred to be in a range of mold internal temperature to ordinary temperature at the time of introduction.

The control air is preferred in the above condition because the explosive sealing phenomenon cannot be prevented sufficiently and partial unevenness occurs in the three-dimensional communicating pores when the pressure is less than 1.5 times, and further preventive effects are not expected at a higher pressure more than 3 times. If the temperature is out of the specified range, unevenness is likely to occur in the sealed state of foamed molding, and homogeneous foamed molding can be hardly obtained.

Generally, when the decompression speed is higher, the expansion is promoted, and the volume porosity is lowered, or when the decompression speed is lower, the expansion is suppressed, and the volume porosity is raised, but since the foaming property of the expandable resin beads varies depending on the type of the resin or pre-foaming process, and the degree of decompression speed, the decompression curve, and the value of control end pressure should be determined by preliminary tests on the basis of the expandable resin beads to be used. The sealing end temperature is the temperature when sealing phenomenon stops its progress.

The sealing temperature and sealing end temperature are values mainly determined by the kind of resin of the expandable resin beads, and in the case of polystyrene resin, for example, the lower limit sealing temperature is 90 to 100° C., and the upper limit is preferred up to 105° C. The sealing end temperature is 110 to 120° C. Therefore, the predetermined sealing temperature at point (a) is set somewhere between the lower sealing temperature and the upper limit. Hence, the adjacent foamed cells are softened and fused, and mutually bonded at the sealing part, and the foamed molding of the invention is obtained.

Effects of the control air can be controlled by the core vent of the mold. That is, to obtain a partly porous product, effects of control air may be increasing by forming more core, vents than usual in the mold, or effects of control air may be suppressed by forming fewer cote vents than usual.

Exemplary Embodiments (First Exemplary Embodiment)

Figure 9:
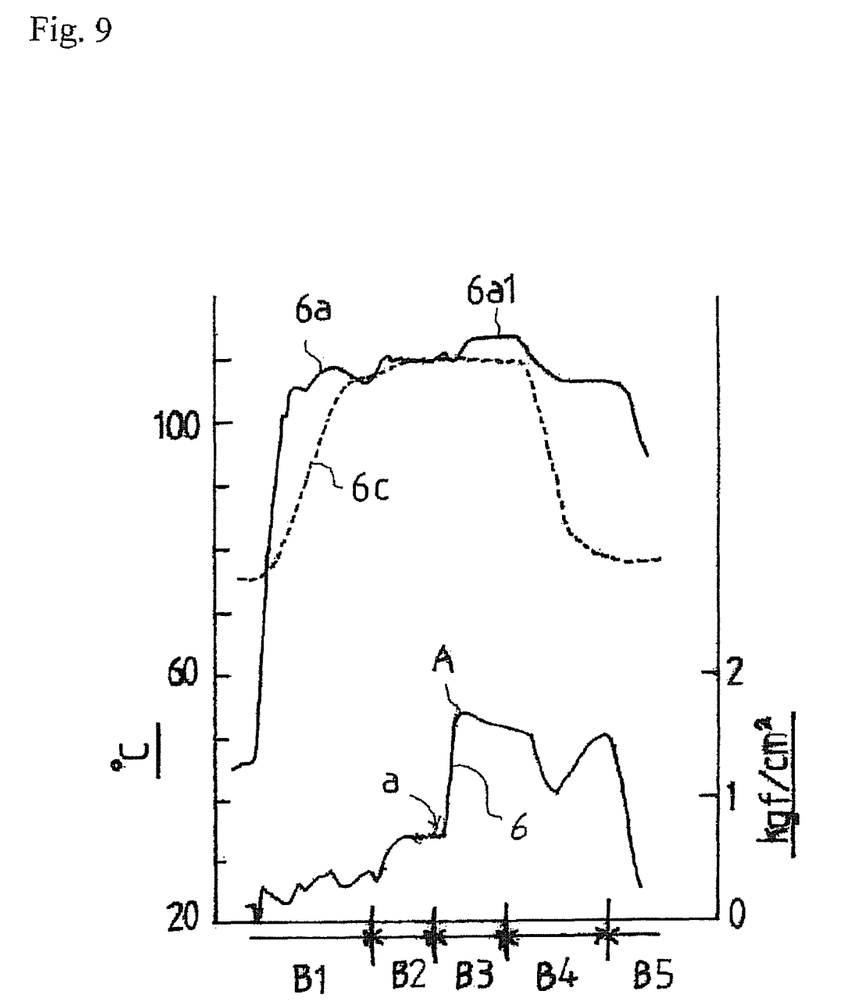
FIG. 9 is a graph showing the relation of mold internal pressure, its temperature, mold temperature, and time in the first preferred embodiment, of the invention.

Following is explanation about manufacturing method of foamed molding used in interior member for an automobile made of polystyrene resin, and characteristics of foamed molding obtained by this method. The specification of manufacturing condition is as designated below, and FIG. 9 shows changes of product inside temperature $6a$, mold temperature (average) $6c$, and mold internal pressure $6$ in the molding process.

a. Foamed Resin
Type=polystyrene resin, particle size=2.5 to 3.5 mm, pre-foaming=processed.

b. Mold
Openable mold of ordinary steam heating type with vent holes at both sides of the cavity.

c. Temperature Elevation Step by Heating Step to Sealing Temperature
Filling with expandable resin beads, evacuation of chamber, and exhausting by heating steam in one direction and exhausting in opposite direction in the cavity are carried out under the conventional conditions.

d. Heating Step to Sealing Temperature
Heating steam of 0.05 to 0.1 MPa is introduced into both chambers for about 3 seconds, and the expandable resin beads in the cavity ate heated up to predetermined sealing temperature (110° C.)

e. Foaming and Sealing Step
At heating end point (a), supply of steam is stopped, and control air is supplied for about 3 seconds, and the mold internal pressure is raised to the specified pressure in Table 1. The product internal temperature reaching up to the sealing temperature is further raised by the steam enclosed in the product, and the foam cells are mutually sealed while forming sealed portions are formed, and the sealed portions are compressed and formed into cross-linking state. The mold internal pressure is raised to a specified pressure by control air in a short time, for example, in a short time within 5 seconds preferably.

Immediately before supply of control air, it is important that the product internal temperature is already at sealing temperature, and in this state, air of high pressure than the saturation pressure at this time is introduced, and the mold internal pressure is raised to high pressure as specified, and the steam in the foam cells and among the cells is compressed instantly, probably therefore the product internal temperature is raised temporarily. This temperature rise seems to promote sealing among of cells. At the same tie, a high control pressure (0.1 to 0.2 MPa) works to suppress the sealed foam cells having a foaming pressure (0.1 to 0.12 MPa) inclined to increase by temperature rise, and the cross-linked sealed portions crossed between cells are formed.

f. Cooling Step
While the pressure raised by the control air is held, cold water is poured into the chamber to cool.

g. Air Cooling and Demolding Step
The exhaust valve of the chamber is opened, and the internal air is exhausted, and the mold is opened to take out the molding.

The obtained foamed molding was evaluated, and the properties as shown in Table 1 were obtained. From samples of the embodiment, the foamed moldings having both three-dimensional permeable pores and suitable strength were obtained, but when the pressure was low, in sample 1, the ventilation amount was small and varied. When the pressure was raised 1.5 times or more of the mold internal pressure, variations depend on portions were small, and at 2 times or more, almost no variations were noted, and the preferred quality was obtained in the aspects of porosity, strength, and sound absorbing property. Comparative example 11 was a molding obtained from the conventional molding method, and the desired porous structure of the invention was not obtained although the strength was excellent. As a result of observation of the cut section of the samples of the embodiment, the foam cells were particles having almost circular or elliptical section, and adjacent foam cells were mutually softened, fused and bonded on the contact faces.

The space surrounded by these foam cells was formed of permeable pores like mesh in the molding, and a three-dimensional porous structure was observed on the whole, and the sound absorbing properties were measured under the condition of sample thickness of 15 mm and frequency region of, 100 to 3000 Hz (JIS A 1405), and an excellent sound absorbing performance of low-pitched sound having a sound absorbing peak of 30% or more was confirmed.

TABLE 1

| Sample No. | Comparative example | Sample of embodiment | | | |
|---|---|---|---|---|---|
| | | 1 | 2 | 3 | 4 |
| Applied pressure (MPa) | — | 0.07 | 0.10 | 0.15 | 0.20 |
| Applied pressure ratio | — | 1.05 | 1.5 | 2.25 | 3.0 |
| Convex side ventilation volume (cc) | 0 | 12 ± 5 | 24 ± 5 | 28 ± 1 | 30 ± 0 |
| Concave side ventilation volume (cc) | 0 | 15 ± 3 | 27 ± 2 | 29 ± 1 | 30 ± 0 |
| Average volume porosity (%) | 0 | 10 | 19 | 27.3 | 34.5 |
| Bending limit strength (N) | 20-22 | 12.2 | 15.6 | 16.2 | 17.4 |
| Sound absorbing performance | X | ○ | ⊚ | ⊚ | ⊚ |

The samples of the embodiment were confirmed to have enough strength for withstanding handling and as structural member. As a result of observation of the cut section, the adjacent foam cells were confirmed to be mutually softened, fused, and bonded on the contact faces. In particular, in samples 2, 3 and 4, as shown in FIG. 4 (B), the foam cells 11, 11 bonded with the sealed portion 2c are mutually isolated in position, and the sealed portion 2c is formed like a bridge between the cells, and a clear cross-linking state was observed.

Thus, the foamed molding of the invention has the sound absorbing effect owing to its three-dimensional porous structure, and the material strength, heat resistance and durability of the foamed resin, and it is found to be useful not only in interior members for an automobile, but also in vehicle floor flat member, sound absorbing member for housing wall and building, noise suppressing member for industrial, machine and road, exhaust and sound insulating duct for plant and subway, and many other noise suppressing and sound absorbing materials.

The ventilation shown in Table 1 is the average of measurements at five positions of the sample facing the convex side and concave side of the mold. In free state, air was discharged at a rate of 30 L/minute from the nozzle tip 2.5 cm². The nozzle was contacted with the measuring unit, and the average ventilation per minute was measured. The average volume porosity is based on 100% porosity of gap space in beads state before fusion. The bending limit strength was measured by using method specified in JIS-K7221. For sound absorbing performance, the perpendicular injection sound absorbing rate measuring instrument specified in JIS A 1405 was used and, samples of 15 mm in thickness were measured in frequency range of 50 to 1600 Hz. The sound absorbing rate specified in JIB of 30% or more was evaluated as excellent (⊚), 20 to 30% as good (o), and 20% or less as poor (x).

(Second Exemplary Embodiment)

Following is explanation about manufacturing method in the second exemplary embodiment of the invention.

Figure 10:
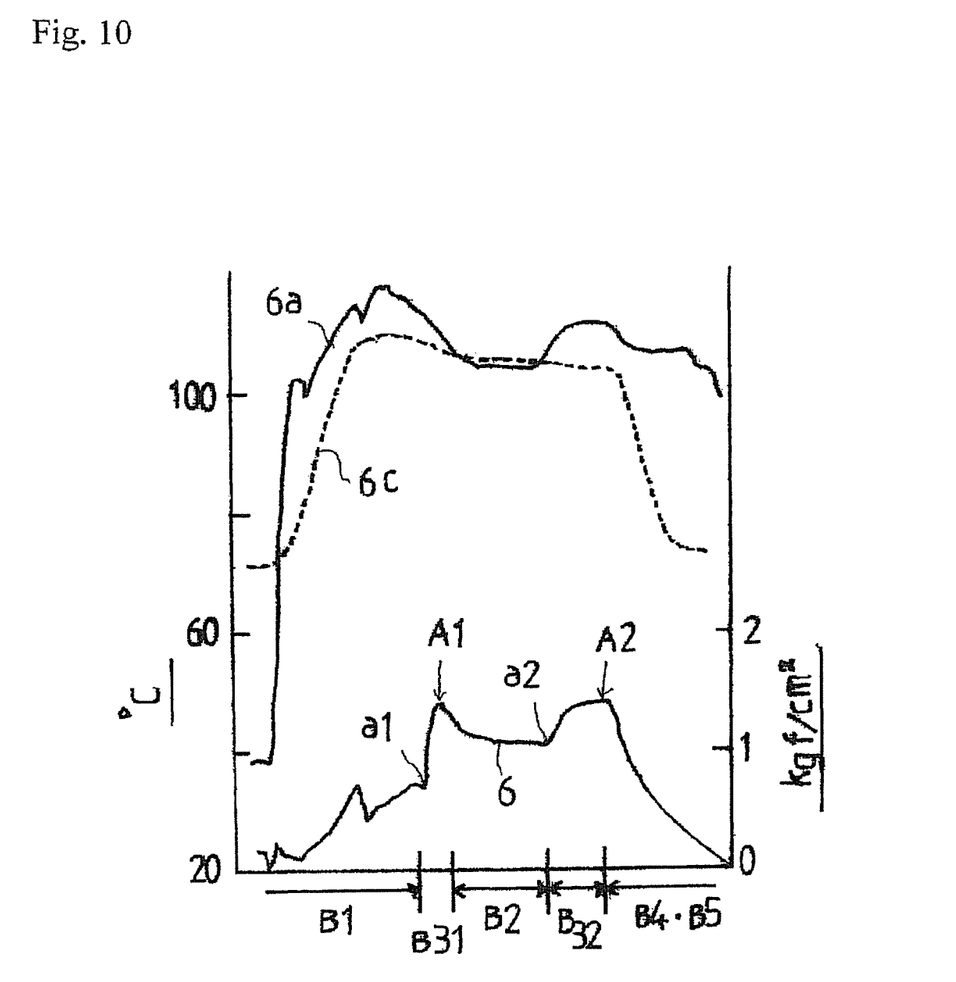
FIG. 10 is a graph showing the relation of mold internal pressure, its temperature, mold temperature, and time in the second preferred embodiment of the invention.

In this case, the conditions are same as in the first exemplary embodiment except for the following points. FIG. 10 shows changes of mold internal temperature 6a, mold temperature (average) 6c, and mold internal pressure 6 in the molding process.

In the second exemplary embodiment, at the end point of chamber evacuation in temperature elevation step, and exhaust in one direction and exhaust in opposite direction by the heating steam in the cavity, the control air is introduced in the control air feed step, and the expandable resin beads in the cavity are heated by heating steam to specified sealing temperature in the sealing temperature heating step. The process is succeeded by the foaming and sealing step of feeding control air, and followed by the cooling and discharge step of pouring water into the chamber while maintaining the pressure raised by the control air, and finally the exhaust valve of the chamber is opened, and gas is exhausted outside, and the mold is cooled and demolded in atmospheric state in the cooling and demolding step.

In the second, exemplary embodiment, before and after the sealing temperature heating step B2, control air is supplied, and the first control air feed step B31 is the operation for suppressing the sealing by compressing and cooling the foamed particles by raising pressure up to pressure A1 by feeding control air, in order to prevent variations of porous structure due to advancement of sealing of foamed particles partially reaching the sealing temperature at end point a1 of temperature elevation step Same as in the first exemplary embodiment, at end point a2 of successive sealing temperature heating step B2, control air is introduced to raise to pressure A2 at foaming and sealing step B32, and similarly, while balancing between the particle internal pressure (particle inner pressure) and external pressure (cavity inner pressure), a sealed portion is formed on the contact face while leaving gaps (volume porosity) among expandable resin beads. Thus, the foamed molding of the same properties as in the first exemplary embodiment is obtained, and further it is more advantageous because the control air of lower pressure than the pressure in the first exemplary embodiment can be utilized.

The invention claimed is:

1. A manufacturing method of foamed molding composed of a foamed molding obtained by heating and foaming of expandable resin beads filled in a mold, the method comprising filling expandable resin beads in a mold, forming three-dimensional permeable pores defining a volume porosity of 10 to 40% among foam cells by softening and fusing mutually adjacent foam cells on contact faces thereof, by heating the expandable resin beads at a sealing temperature of the expandable resin beads in the presence of heating steam, and sealing and cooling the foam cells while controlling the foaming amount by controlling a pressure so as to foam the expandable resin beads while maintaining a balance between an internal pressure of the expandable resin beads and an external pressure within the mold so that the expandable resin beads are mutually pressed while leaving a space mutually between the expandable resin beads and are sealed on contact faces thereof, thereby obtaining the foamed molding having a bending limit strength of at least 10N, wherein the heated steam filled in the mold is preliminarily displaced with air or wherein the heated steam filled in the mold is displaced with air while controlling the pressure.

2. The manufacturing method of foamed molding of claim 1, wherein the pressure control is conducted up to a sealing end temperature of the expandable resin beads.

3. The manufacturing method of foamed molding of claim 1, wherein a foamed molding reinforced by adding a reinforcing foam is manufactured using a mold provided with individual passages communicating with external piping.

4. The manufacturing method of foamed molding of claim 1, wherein the foam cells define particles having a substantially elliptical sectional shape with a major diameter/minor diameter ratio of about 3.0.

5. The manufacturing method of foamed molding of claim 1, wherein a size of major diameters of the foam cells is in a range of 1.5 mm to 5.5 mm.

* * * * *